(12) United States Patent
Koepsell et al.

(10) Patent No.: US 9,157,318 B2
(45) Date of Patent: Oct. 13, 2015

(54) DETERMINING DIFFERENTIAL STRESS BASED ON FORMATION CURVATURE AND MECHANICAL UNITS USING BOREHOLE LOGS

(75) Inventors: Randy Koepsell, Highlands Ranch, CO (US); Tom R. Bratton, Littleton, CO (US)

(73) Assignee: Schlumberger Technology Corporation, Sugar Land, TX (US)

( * ) Notice: Subject to any disclaimer, the term of this patent is extended or adjusted under 35 U.S.C. 154(b) by 856 days.

(21) Appl. No.: 13/299,106

(22) Filed: Nov. 17, 2011

(65) Prior Publication Data

US 2012/0173216 A1    Jul. 5, 2012

Related U.S. Application Data

(60) Provisional application No. 61/429,530, filed on Jan. 4, 2011.

(51) Int. Cl.
*G06F 7/60* (2006.01)
*E21B 49/00* (2006.01)
*G01V 1/30* (2006.01)
*G01V 1/50* (2006.01)

(52) U.S. Cl.
CPC . *E21B 49/00* (2013.01); *G01V 1/30* (2013.01); *G01V 1/50* (2013.01); *G01V 2210/626* (2013.01); *G01V 2210/646* (2013.01); *G01V 2210/66* (2013.01); *G01V 2210/665* (2013.01)

(58) Field of Classification Search
None
See application file for complete search history.

(56) References Cited

U.S. PATENT DOCUMENTS

| | | | |
|---|---|---|---|
| 6,389,361 B1 * | 5/2002 | Geiser | 702/15 |
| 7,457,194 B2 | 11/2008 | Prioul et al. | |
| 2008/0062814 A1 * | 3/2008 | Prioul et al. | 367/31 |
| 2009/0157319 A1 * | 6/2009 | Mitchell | 702/9 |
| 2009/0248374 A1 * | 10/2009 | Huang et al. | 703/2 |
| 2012/0239298 A1 * | 9/2012 | Morris et al. | 702/2 |

OTHER PUBLICATIONS

"Joints at high angles to normal fault strike: an explanation using 3-D numerical models of fault-perturbed stress fields", Kattnhorn, et al. © 1999 Elsevier Science Ltd.*

(Continued)

*Primary Examiner* — Omar Fernandez Rivas
*Assistant Examiner* — Nithya J Moll
(74) *Attorney, Agent, or Firm* — Gary Gex

(57) ABSTRACT

A method for performing wellbore operations of a field having a subterranean formation. The method includes determining, based on an image log of a wellbore penetrating the subterranean formation, a plurality of interpreted geological surfaces, identifying a plurality of estimated slickensides from the plurality of interpreted geological surfaces based on at least one pre-determined criterion, calculating, using a processor, a differential stress using a curvature model representing at least one mechanical unit defined by the plurality of estimated slickensides, generating a stress model using the differential stress, identifying a modeled wellbore stress-induced failure in response to a total stress value in the stress model exceeding a strength property of the subterranean formation, determining a difference between the modeled wellbore stress-induced failure and an observed stress-induced failure in the subterranean formation, and updating the stress model by adjusting the plurality of estimated slickensides to, in turn, adjust the difference.

17 Claims, 8 Drawing Sheets

(56) References Cited

OTHER PUBLICATIONS

M. Schoenberg et al., "Seismic anisotropy of fractured rock," Geophysics, Jan./Feb. 1995, vol. 60(1): pp. 204-211.
Takeshi Endo et al., "Fracture Evaluation from Inversion of Stoneley Transmission and Reflections," Proceedings from the 4th Well Logging Symposium of Japan, Society of Professional Well Log Analysts, Japan Charter, Sep. 1998: pp. 1-6.
A. Donald et al., "Advancements in Acoustic Techniques for Evaluating Open Natural Fractures," SPWLA 47th Annual Logging Symposium, Jun. 2006: pp. 10.
B. E. Hornby et al., "Fracture evaluation using reflected Stoneley-wave arrivals," Geophysics, Oct. 1989, vol. 54 (10): pp. 1274-1288.
Tom Bratton et al., "Logging-While-Drilling Images for Geomechanical, Geological and Petrophysical Interpretations," SPWLA 40th Logging Symposium, May/Jun. 1999: pp. 1-14.
Ben J. Stephenson et al., "Structural and stratigraphic controls on fold-related fracturing in the Zagros Mountains, Iran: implications for reservoir development," Fractured Reservoirs, The Geological Society of London, Special Publications, 2007, vol. 270: pp. 1-21.
Haiqing Wu et al., "Imaging 3-D fracture networks around boreholes," AAPG Bulletin, Apr. 2002, vol. 86(4): pp. 593-604.
D. Astratti et al., "Seismic to Simulation Fracture Characterization of a Green Carbonate Reservoir in Presence of Large Uncertainties," Abu Dhabi International Petroleum Exhibition and Conference, 2010: pp. 1-10.
Steve Bonner et al., "Resistivity While Drilling—Images from the String," Schlumberger Oilfield Review, Mar. 1996: pp. 4-64.

* cited by examiner

FIG. 2.1
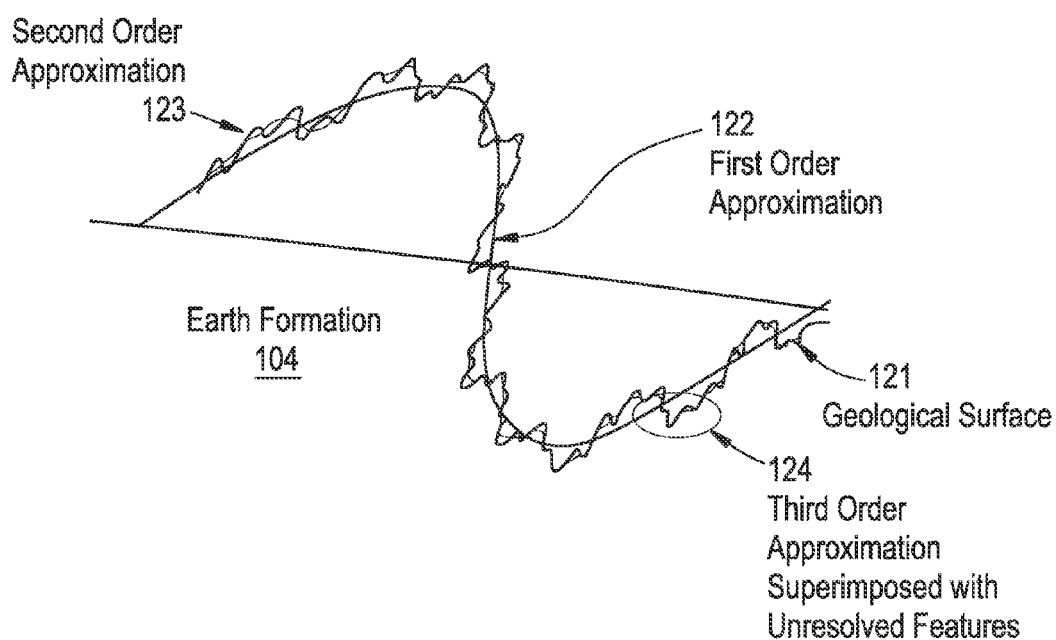
FIG. 2.2
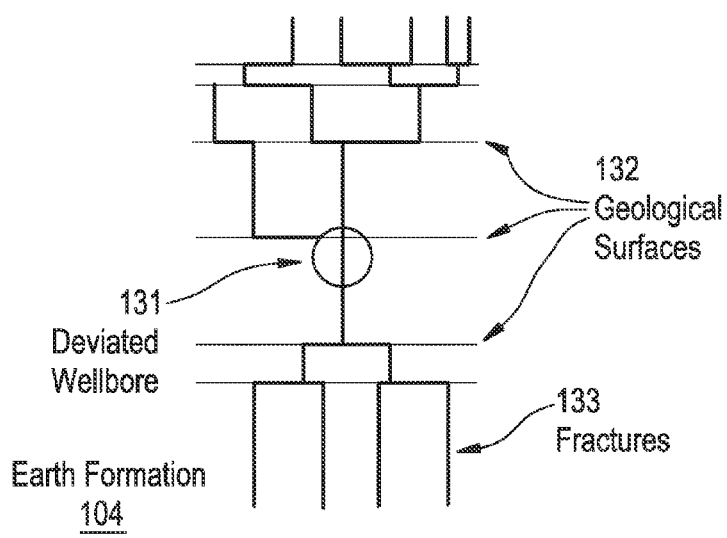

FIG. 2.3
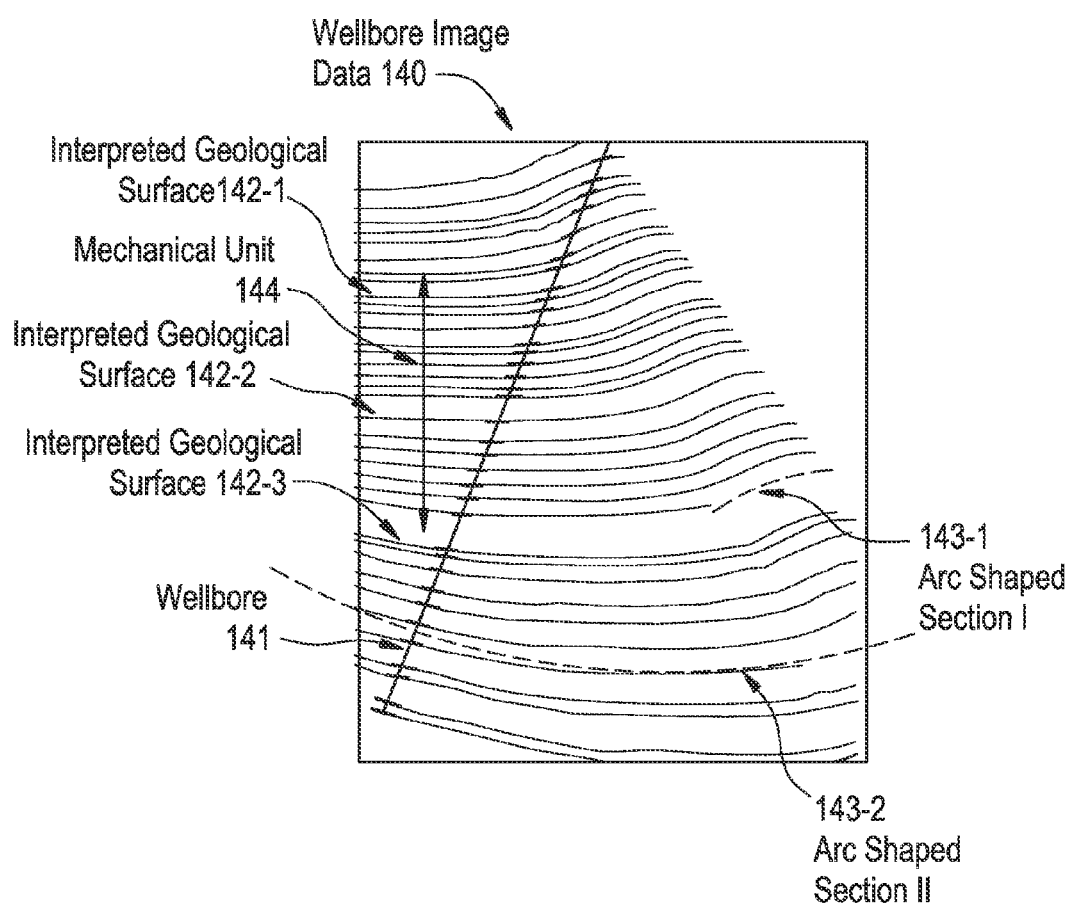

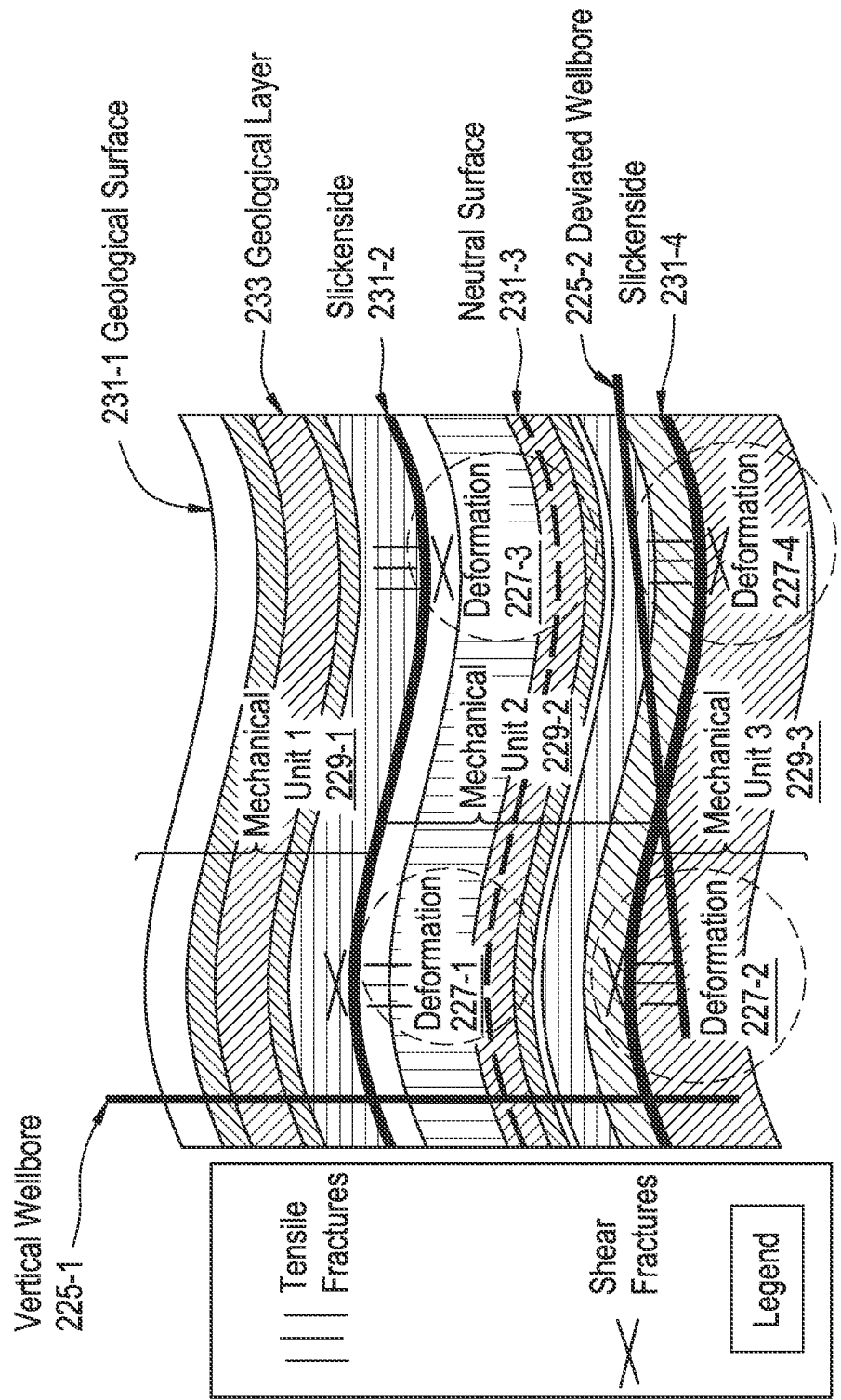

FIG. 2.5
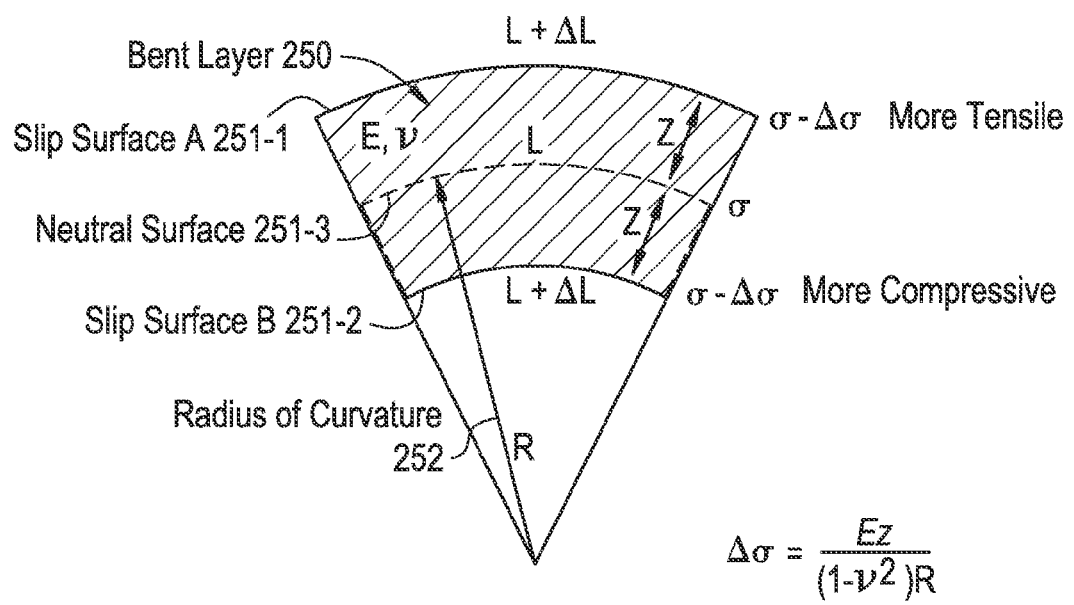

FIG. 3.1
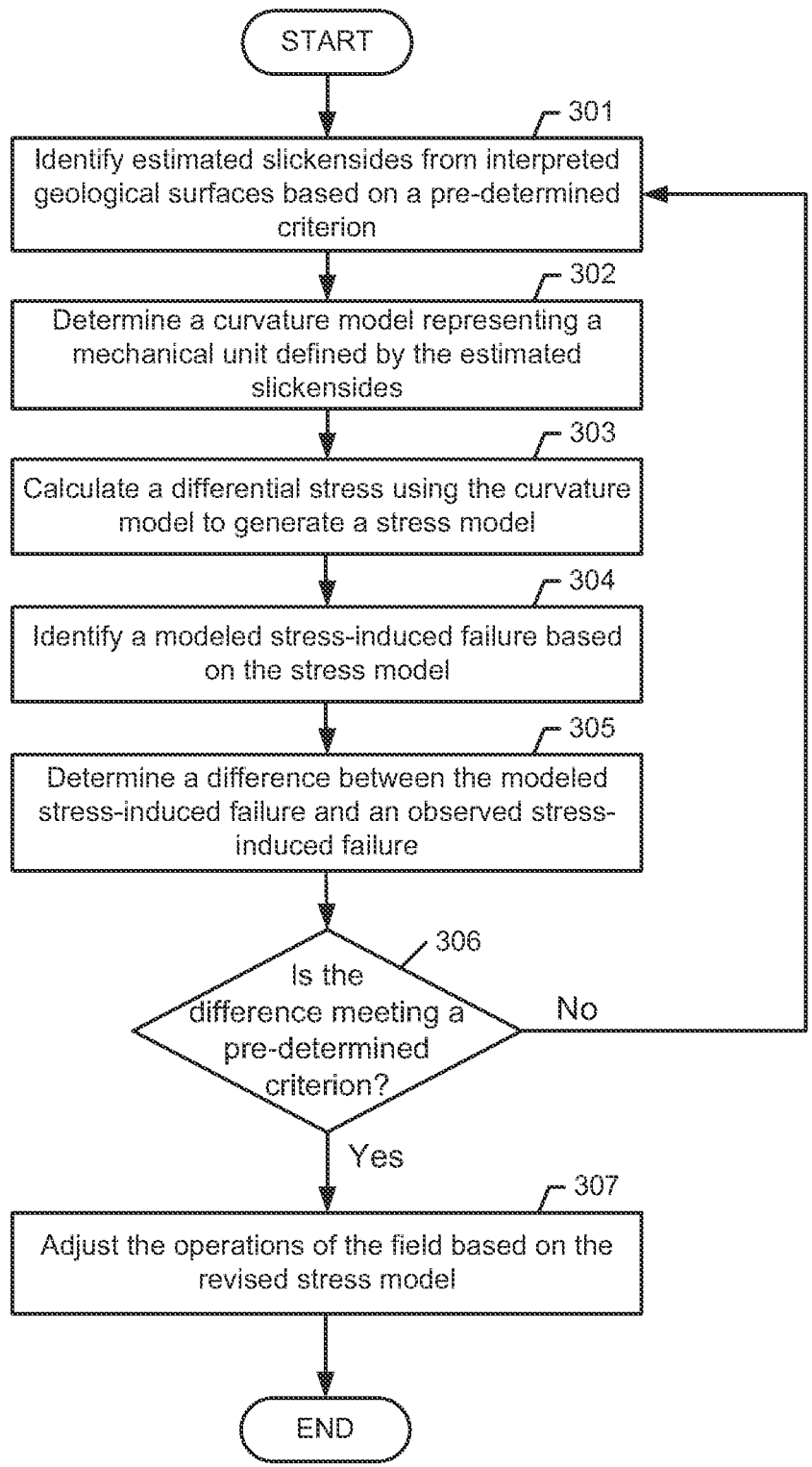

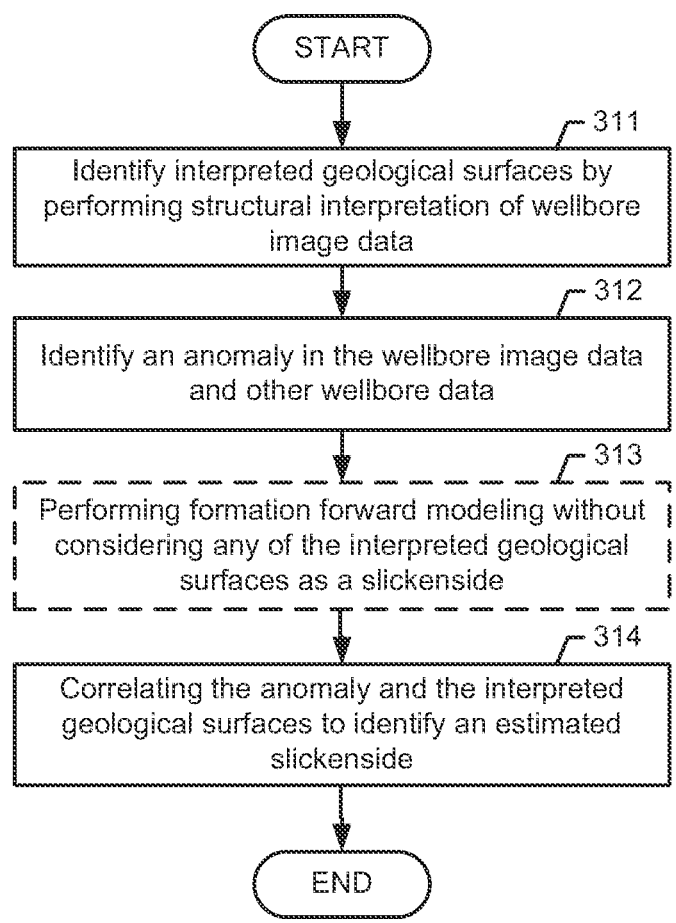
FIG. 3.2

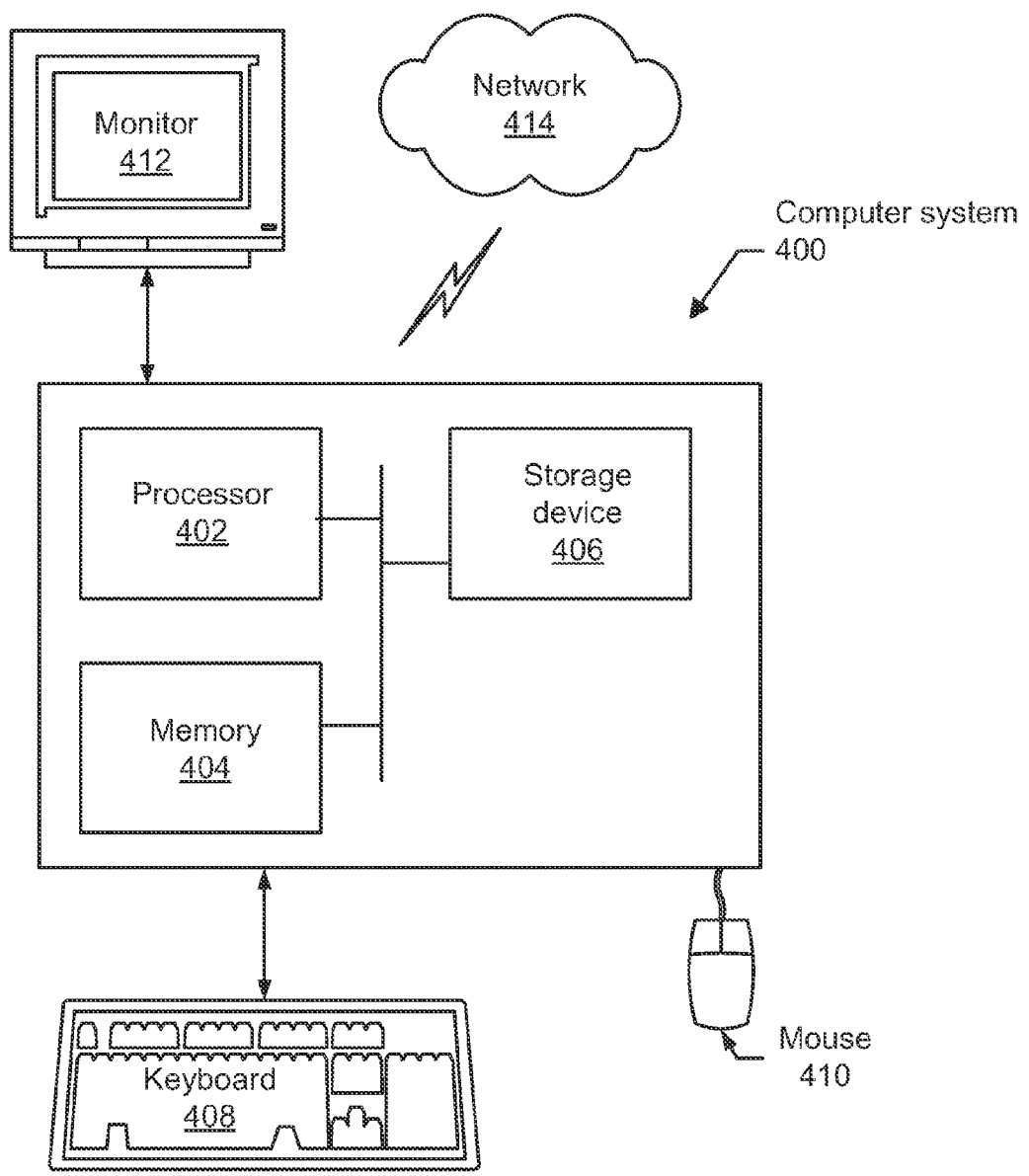

DETERMINING DIFFERENTIAL STRESS BASED ON FORMATION CURVATURE AND MECHANICAL UNITS USING BOREHOLE LOGS

CROSS-REFERENCE TO RELATED APPLICATIONS

This application claims benefit under 35 U.S.C. §119(e) of U.S. Provisional Patent Application No. 61/429,530, filed on Jan. 4, 2011, and entitled "Method, System, Apparatus and Computer Readable Medium for Determining Differential Stress Based on Formation Curvature and Mechanical Units using Borehole Logs," which is hereby incorporated by reference.

BACKGROUND

Operations, such as geophysical surveying, drilling, logging, well completion and production, are typically performed to locate and gather valuable downhole fluids. Surveys are often performed using acquisition methodologies, such as seismic mapping, resistivity mapping, etc. to generate images of underground formations. These formations are often analyzed to determine the presence of subterranean assets, such as valuable fluids or minerals, or to determine if the formations have characteristics suitable for storing fluids. Although the subterranean assets are not limited to hydrocarbons such as oil, throughout this document, the terms "oilfield" and "oilfield operation" may be used interchangeably with the terms "field" and "field operation" to refer to a site where any types of valuable fluids or minerals can be found and the activities required to extract them. The terms may also refer to sites where substances are deposited or stored by injecting them into the surface using boreholes and the operations associated with this process. Further, the term "wellbore operation" refers to a field operation associated with a wellbore, including activities related to wellbore planning, wellbore drilling, wellbore completion, and/or production using the wellbore.

Fractures in the earth play an essential role in influencing the movement of fluids in rocks. Fractures may be of natural origin or may be created artificially by operations associated with the exploitation of hydrocarbon or mineral reserves. For example, fractures may be deliberately induced in an oil or gas well by raising the wellbore fluid pressure until the surrounding rock fails in tension. Such rock failure may include failures in shear, pore collapse, etc. Fractures produced in this manner are known as hydraulic fractures and they are frequently used in the petroleum industry to enhance production (i.e., stimulation) by providing high permeability conduits that promote the flow of hydrocarbons into the wellbore.

The production of hydrocarbon and the stimulation design is historically based upon intrinsic properties of the rock such as petrophysical properties or stiffness properties and extrinsic loading of the formation such as the magnitude and orientation of the far-field stress. Typically these formation parameters are used to affect the operation of the wellbore drilling and completion procedure. For example porosity, saturation, permeability, natural fractures, stress magnitude and orientations have been measured to characterize the reservoir. However, the application of these properties has not fully solved the dilemmas encountered in hydraulic stimulation and drilling optimization. The production and drilling profile in many wellbores are highly variable. It has been observed in numerous vertical and horizontal completions to have non uniform production, to the point that many intervals are not flowing. The pressures measured in the wellbore during hydraulic fracturing may be interpreted to obtain an estimate of the magnitude of stress in the earth. In order to optimize production and understand where fractures may be induced in the formation, it is essential to correctly interpret stress in the earth based on an understanding of local geology and how it relates to the local reservoir properties.

SUMMARY

In general, in one aspect, the invention relates to a method for performing wellbore operations of a field having a subterranean formation. The method includes determining, based on an image log of a wellbore penetrating the subterranean formation, a plurality of interpreted geological surfaces, identifying a plurality of estimated slickensides from the plurality of interpreted geological surfaces based on at least one pre-determined criterion, calculating, using a processor, a differential stress using a curvature model representing at least one mechanical unit defined by the plurality of estimated slickensides, generating a stress model using the differential stress, identifying a modeled wellbore stress-induced failure in response to a total stress value in the stress model exceeding a strength property of the subterranean formation, determining a difference between the modeled wellbore stress-induced failure and an observed stress-induced failure in the subterranean formation, and updating the stress model by adjusting the plurality of estimated slickensides to, in turn, adjust the difference.

Other aspects of determining differential stress based on formation curvature and mechanical units using borehole logs will be apparent from the following description and the appended claims.

BRIEF DESCRIPTION OF DRAWINGS

The appended drawings illustrate several embodiments of determining differential stress based on formation curvature and mechanical units using borehole logs and are not to be considered limiting of its scope, for determining differential stress based on formation curvature and mechanical units using borehole logs may admit to other equally effective embodiments.

FIG. 2.1 depicts a schematic representation of a geological surface in an earth formation illustrating multiple orders of curvature according to embodiments of determining differential stress based on formation curvature and mechanical units using borehole logs.

FIG. 2.2 depicts a schematic cross-sectional view of an earth formation penetrated by a deviated wellbore and having example fractures according to embodiments of determining differential stress based on formation curvature and mechanical units using borehole logs.

FIG. 2.3 depicts structurally interpreted wellbore image data for determining differential stress based on formation curvature and mechanical units using borehole logs in accordance with one or more embodiments.

FIG. 2.4 depicts a schematic cross-sectional view of an earth formation having example mechanical units for determining differential stress based on formation curvature and mechanical units using borehole logs in accordance with one or more embodiments.

FIG. 2.5 depicts a curvature model of a mechanical unit for determining differential stress based on formation curvature and mechanical units using borehole logs in accordance with one or more embodiments.

FIGS. 3.1 and 3.2 depict an example method for determining differential stress based on formation curvature and mechanical units using borehole logs in accordance with one or more embodiments.

FIG. 4 depicts a computer system for determining differential stress based on formation curvature and mechanical units using borehole logs in accordance with one or more embodiments.

DETAILED DESCRIPTION

Figure 1:
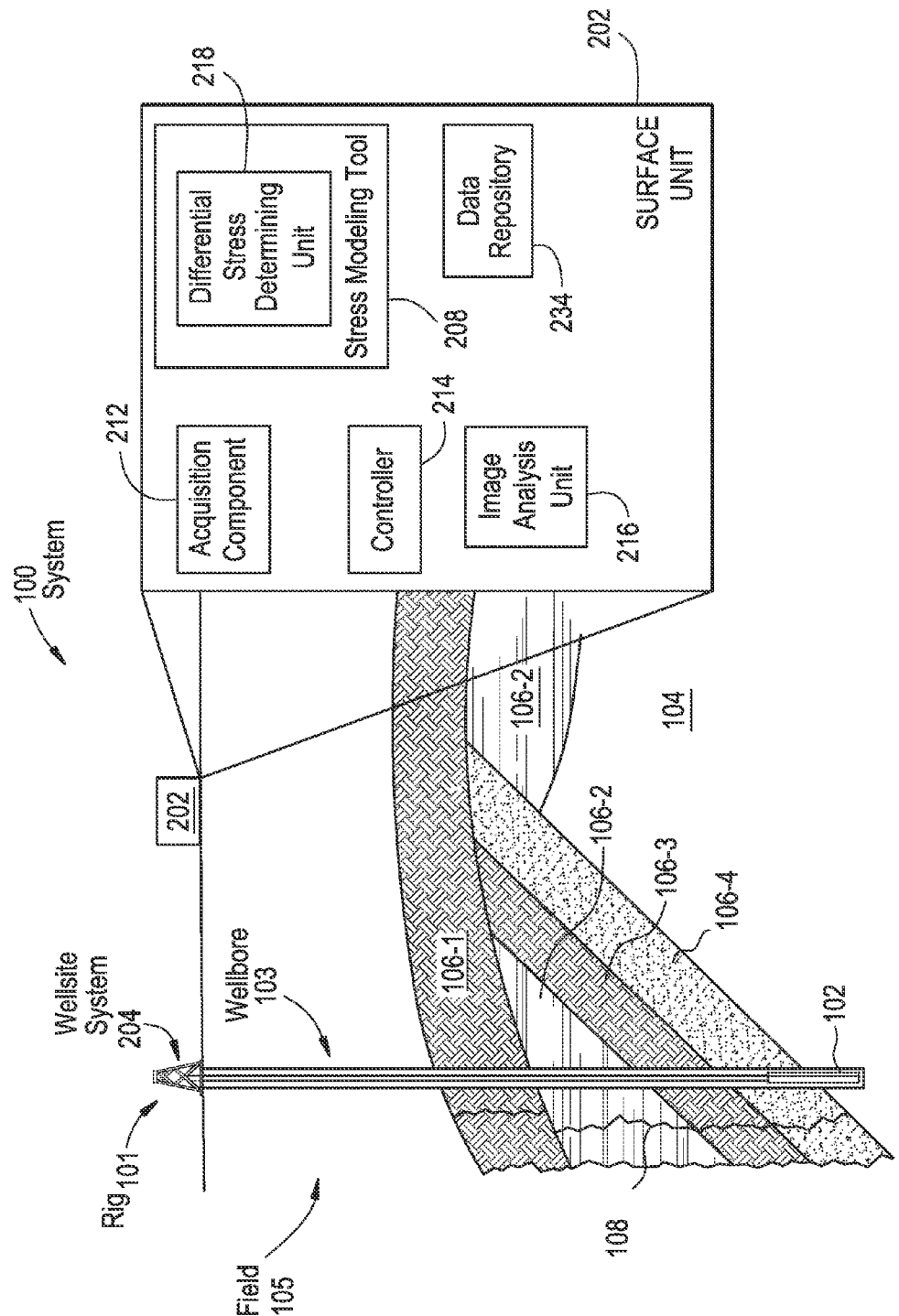
FIG. 1 depicts a system for determining differential stress based on formation curvature and mechanical units using borehole logs in accordance with one or more embodiments.

Embodiments are shown in the above-identified drawings and described below. In describing the embodiments, like or identical reference numerals are used to identify common or similar elements. The drawings are not necessarily to scale and certain features may be shown exaggerated in scale or in schematic in the interest of clarity and conciseness.

Embodiments of the present disclosure include a method, system, apparatus, and computer readable medium for determining high resolution differential stress based on local formation curvature and mechanical units using borehole logs. The high resolution differential stress may then be combined with other sources of stress in the earth (e.g., wellbore stress, far-field stress, reservoir facies elastic moduli, etc.) to generate specific, local, and unique stress maps along the well path. The collective stress may then be used for the design of hydraulic stimulation and well construction including drilling design and completion design.

FIG. 1 depicts a schematic view, partially in cross section of a field (105) having a system (100) for determining differential stress related to a subterranean formation (104). In one or more embodiments, one or more of the modules and elements shown in FIG. 1 may be omitted, repeated, and/or substituted. Accordingly, embodiments of determining differential stress based on formation curvature and mechanical units using borehole logs should not be considered limited to the specific arrangements of modules shown in FIG. 1.

As shown in FIG. 1, the subterranean formation (104) includes several geological structures (106-1 through 106-4). As such, the formation is illustrated as having a sandstone layer (106-1), a limestone layer (106-2), a shale layer (106-3), and a sand layer (106-4). In one or more embodiments, various data acquisition tools are adapted to measure the formation and detect the characteristics of the geological structures of the formation.

The system (100) includes a surface unit (202) operatively connected to a wellsite system (204). Generally, the surface unit (202) and wellsite system (204) may include various field tools and wellsite facilities. The wellsite system (204) may be further associated with a rig (101), a wellbore (103), and other wellsite equipment and is configured to perform oilfield operations, such as logging, drilling, fracturing, production, or other applicable operations. These oilfield operations are typically performed as directed by the surface unit (202). In one or more embodiments, the surface unit (202) is configured to communicate with the data acquisition tool (102) to send commands to the data acquisition tools (102) and to receive data therefrom. For example, the data acquisition tool (102) may be adapted for measuring downhole properties using logging-while-drilling ("LWD") tools. The surface unit (202) may be provided with computer facilities for receiving, storing, processing, and/or analyzing data from the data acquisition tool (102) or other part of the field (104).

The surface unit (202) may be located at the wellsite system (204) and/or remote locations. In specific embodiments, the surface unit (202) is provided with an acquisition component (212), a controller (214), a transceiver (220), an image analysis unit (216), a stress modeling tool (208), and/or a data repository (234).

In some embodiments the surface unit (202) includes the acquisition component (212) which is configured to collect and/or store a wide variety data of the field. The data may be collected from a variety of channels that provide a certain type of data, such as well logs and other acoustic measurement profiles. For example, the data may be collected at the wellsite system (204) using measurements-while-drilling (MWD) tools, logging-while-drilling (LWD) tools, wireline logging tools, any other similar types of logging measurement tools, or any combination thereof. More specifically, the MWD tools, LWD tools, and/or wireline logging tools may be configured to obtain information related to porosity, saturation, permeability, natural fractures, stress magnitude and horizontal orientations, and/or elastic properties of the formation during a drilling, fracturing, or logging operation of the wellbore at the wellsite system (204).

As an example, a wireline log (108) is a measurement of a formation property as a function of depth taken by an electrically powered instrument to infer properties and make decisions about drilling and production operations. The record of the measurements, which may be printed on a long strip of paper or stored electronically, may also be referred to as a log. Measurements obtained by a wireline log may include resistivity measurements obtained by a resistivity measuring tool.

The data from the acquisition component (212) is passed to the image analysis unit (216) and the stress modeling tool (208) for processing. In one or more embodiments, the image analysis unit (216) is configured to manipulate and analyze the data, such as by performing seismic interpretation or borehole resistivity image log interpretation to identify geological surfaces in the subterranean formation.

In some embodiments the surface unit (202) may also include the stress modeling tool (208) which is configured to model a strength and stress profile of the subterranean formation (104) using an mechanical earth model (MEM). Generally, the MEM is constructed using various available data, such as offset drilling experience, in-situ stress tests, strength measurements on recovered core, etc. For example, the response of a formation to stress may be observed during construction of a borehole and incorporated into the MEM. The earth's far-field stresses are converted to wellbore stresses at the borehole wall. When these stresses exceed the formation strength, irreversible deformations in the near wellbore material occur. The MEM may also incorporate the analysis result of such deformations that reveals the relationship of the various stresses with each other and provides information about formation strength. Real-time logging-while-drilling (LWD) data can be used to refine the strength and stress profiles in the MEM. For example, borehole image may be used for diagnosing the mechanism of wellbore failure and annular pressure while drilling data can help calibrate the strength and stress parameters. While the majority of azimuthal images have been acquired to analyze the geology and petrophysics of reservoirs, the images usually contain artifacts resulting from geomechanical processes. In one or more embodiments, the stress modeling tool (208) is further configured to refine the MEM by analyzing these artifacts. Additional details of analyzing these artifacts to refine the MEM are described in reference to FIGS. 2.1 through 2.5 below.

FIG. 2.1 depicts a schematic representation of a geological surface (121) in the earth formation (104) depicted in FIG. 1 above. In particular, the schematic representation of the geological surface (121) includes multiple orders of curvature according to embodiments of determining differential stress based on formation curvature and mechanical units using borehole logs. For example, the geological surface (121) may correspond to a surface associated with a portion of the geological structures (106-1 through 106-4) depicted in FIG. 1 above. Generally, these geological structures include deformations as a result of structural events that occurred at prior geologic time. As shown, the geological surface (121) is represented as a composite of a first order approximation (122), a second order approximation (123), and third order approximation superimposed with unresolved features (124). The ability to identify the orders of curvature may be based upon the resolution of the data available.

The first order approximation (122) may be based on a geologic record containing large scale data. Examples of geologic records may include geologic models such as continental lithosphere modeling, modeling of mountains such as the Rocky Mountains of the United States, individual geologic records in outcrops, and the geologic modeling of oil and gas fields. For example, the geologic structure maps generated from such geologic records provide the first order approximation (122) based on correlative formation tops. As shown, the first order approximation (122) appears as a sinusoidal curve (referred to as a first order feature of the geological surface (121)), with a large radius of curvature referred to as the first order curvature. Geologic models have been used to measure such first order features and first order curvatures in actual oilfields. For example, the first order features shown in FIG. 2.1 may extend over a range of a few miles with a corresponding range of curvatures and associated radius of curvature. Analyzing the first order features generally does not fully solve the local conditions of the wellbore, which are affected by additional higher resolution structural deformations.

The second order approximation (123) may be determined using higher resolution image analysis techniques to interpret borehole image data or seismic data and provide an increased detail of reservoir compartmentalization. As shown in FIG. 2.1, the second order approximation (123) appears as another sinusoidal curve (referred to as a second order feature of the geological surface (121)), with a range of curvatures referred to as the second order curvature, superimposing on top of the sinusoidal curve of the first order approximation (122). For example, the second order feature in actual oilfields may extend over a range of a few hundred feet to a few thousand feet with a corresponding range of curvatures and associated radius of curvature. Generally, the production of hydrocarbon and the stimulation design may be based upon the petrophysical properties of the reservoir and the orientation/magnitude of far-field stress data obtained by analyzing these second order features. However, the application of these properties may not fully solve the dilemmas encountered in hydraulic stimulation and drilling optimization as described below.

For example, such dilemmas include a highly variable production and drilling profile in many wellbores with numerous vertical and horizontal completions having non-uniform production, to the point that many intervals are not flowing. These non-uniform patterns may correspond to detailed features not yet resolvable using today's 3D seismic analysis techniques, which are commonly used but typically have a seismic amplitude resolution limit in the range of 10-40 feet based on the seismic wavelength. As shown in FIG. 2.1, such detail features are represented as third order approximation superimposed with unresolved features (124) appearing as undulating patterns (referred to as third order features of the geological surface (121)). A portion of each undulating cycle in such details may be resolved using resistivity mapping tools (with a higher resolution limit than seismic mapping tools) and is referred to as a third order feature approximated by a range of small curvatures referred to as the third order curvature. For example, each undulating cycle of the third order feature in actual oilfields may extend over a range of tens of feet to hundreds of feet with a corresponding range of curvatures and associated radius of curvature. The remaining portion of such details in the undulating cycle is beyond the resolution of available image tools and does not generate significant stress that alters the completion. In one or more embodiments, a curvature model of local geology and how it relates to the local reservoir properties are defined to calculate a differential stress along the wellbore, both vertical and horizontal. Details regarding such a curvature model are described in reference to FIGS. 2.4 and 2.5 below.

FIG. 2.2 depicts a schematic cross-sectional view of a portion of the earth formation (104) depicted in FIG. 1 above. As shown in FIG. 2.2, the earth formation (104) is penetrated by a deviated wellbore (131) (shown as a cross-section) and includes example fractures (133) according to embodiments of determining differential stress based on formation curvature and mechanical units using borehole logs. Further, the formation (104) includes geological surfaces (132), which may correspond to the geological surface (121) depicted in FIG. 2.1 and surfaces associated with the geological structures (106-1 through 106-4) depicted in FIG. 1. Generally, the geological surfaces (132) in the vicinity (e.g., within hundreds of feet) of a wellbore can be identified by performing a structural interpretation of a borehole image log as described in reference to FIG. 2.3 below.

Further as shown in FIG. 2.2, the fractures (133) may be induced in a hydraulic fracturing operation performed by applying pressure (i.e., hydraulic pressure) to a section of the wellbore wall of the deviated wellbore (131). The propagation paths of the fractures (133) represent a region where the rock is damaged by incremental shear or tension produced by the pressurized fracturing fluid that exceeds the strength of the rock. Although specific patterns of the fractures (133) are shown in FIG. 2.2, other geometrical configurations are possible depending on other stresses in the formation, the properties of the rock, the presence of mechanical defects in the wellbore wall, the presence of the geological surfaces (132) in the vicinity of the deviated wellbore (131), and the design of the hydraulic fracturing operation.

FIG. 2.3 is a screenshot of structurally interpreted wellbore image data (140) of a wellbore (141) in accordance with one or more embodiments. For example, the wellbore (141) may be essentially the same as the wellbore (103) depicted in FIG. 1 above or the deviated wellbore (131) depicted in FIG. 2.2 above.

In one or more embodiments, the structural interpretation may be performed using various wellbore image logs, such as a resistivity image log, an acoustic image log, a neutron image log, etc. In particular, the resistivity imaging analysis technique provides high resolution results typically within hundreds of inches of the wellbore. An example resistivity imaging analysis technique is described in Bonner et al., "Resistivity While Drilling—Images from the String," Schlumberger Oilfield Review, Spring 1996.

As shown within the structurally interpreted wellbore image data (140), patterns in the resistivity image are analyzed to identify geological structures, such as the interpreted geological surfaces (142-1, 142-2, 142-3). Based on the higher resolution capability of structural analysis using the resistivity image, the interpreted geological surfaces (142-1, 142-2, 142-3) may contain better defined third order features that are not resolvable using seismic interpretation techniques, as described in reference to FIG. 2.1 above. As shown, each of the interpreted geological surfaces (142-1, 142-2, 142-3) exhibits arc shaped sections, such as the arc shaped section I (143-1) and arc shaped section II (143-2). For example, the curvatures of the arc shaped section A (143-1) and arc shaped section B (143-2) may be within the range of the second order curvature depicted in FIG. 2.1 above. In another example, the curvature of either one or both of the arc shaped section I (143-1) and arc shaped section II (143-2) may be within the range of the third order curvature corresponding to the third order approximation superimposed with unresolved features (124) described in reference to FIG. 2.1 above. As noted above, the third order features may extend over a range of a few tens of feet to a few hundreds of feet in an actual oilfield.

Further, a potential hydrocarbon reservoir may be identified and analyzed based on an interpretation and analysis of seismic reflection data. As noted above, the production of hydrocarbon and the stimulation design may be based upon the petrophysical properties of the reservoir and the orientation/magnitude of stress data obtained by analyzing characteristics of the interpreted geological surfaces (142-1, 142-2, 142-3). Typically, formation property parameters may be used to affect the operation of the wellbore drilling and completion procedure. For example, porosity, saturation, permeability, natural fractures, stress magnitude, and horizontal orientations may be measured to characterize the reservoir. However, the application of these properties may not fully solve the dilemmas encountered in hydraulic stimulation and drilling optimization without considering the effect of the third order features.

The layer portioning of structural features may include the development of bed parallel slippage in flexural folding. Such structural deformation may develop local strain; however, such slippage may not be easily identifiable using structural interpretation techniques or other analyses of the borehole data. For example, one or more of the interpreted geological surfaces (142-1, 142-2, 142-3) may be associated with bed parallel slippage without showing any readily noticeable difference from other non-slippage related surfaces in the structurally interpreted wellbore image data (140). Geologically, a slickenside (or slip surface) is a smoothly polished surface caused by frictional movement between rocks along the two sides of a fault. The polished surface may be striated in the direction of the movement. Slickensides are routinely observed in outcrops and whole cores when available without direct correlation to interpreted geological features identified using resistivity image log, such as shown in the structurally interpreted wellbore image data (140).

In one or more embodiments, estimated slickensides are identified by correlating interpreted features (e.g., interpreted geological surfaces (142-1, 142-2, 142-3)) from a wellbore image log to anomalies exhibited in other borehole data. Throughout this disclosure, the term "anomaly" is used to refer to a local variation with a value change exceeding a limit based on a pre-determined criterion. The anomalies in the borehole data may include an increase in permeability, an increase in amplitude attenuation and/or a slowness (i.e., increase in velocity) in Stoneley wave characteristics, a decrease in resistivity, brecciata rock fragments along a bedding plane surface observed along with image data, and/or an enlargement of borehole caliper, among other anomalies. Specifically, the anomalies are identified when one or more of the permeability increase, Stoneley attenuation increase, Stoneley slowness (i.e., increase in velocity) increase, resistivity decrease, and/or borehole caliper increase is found to exceed a limit based on a pre-determined criterion. For example, the Stoneley wave characteristics are particularly sensitive to permeability anomalies typically associated with slickensides. In some cases, a Stoneley wave interpretation may have a vertical resolution of approximately two feet.

While a fixed threshold may be used as a criterion for identifying anomalies to determine estimated slickenside locations, the magnitude and distance range of the anomalies may vary considerably depending on borehole size/shape and mud/formation properties. For example, the resistivity curve may decrease from 10 ohm·m to 5 ohm·m at a slickenside in one wellsite, but decrease from 1 ohm·m to 0.5 ohm·m in a different wellsite. In one or more embodiments, forward modeling of the formation is performed, where the effect of the increased permeability (or other formation property parameter such as Stoneley wave characteristics, etc.) in the slickenside is not modeled, and the modeled parameter curve is compared with the measured curve in the borehole log. Differences between the measured data and modeled curve can be quantified based on a pre-determined measure (e.g., a summation of absolute value magnitude differences or root-mean-squared magnitude differences over a range) to identify the aforementioned anomalies. In one or more embodiments, forward modeling of the formation is performed using tool response equations known to those skilled in the art.

As shown in FIG. 2.3, the interpreted geological surfaces (142-1, 142-3) may be selected as estimated slickensides defining (enclosing) a bent layer shaped region that is referred to as a mechanical unit (144). In one or more embodiments, the mechanical unit (144) is associated with a curvature model identifying the interpreted geological surface (142-3) as associated with incremental tensile stress and the interpreted geological surface (142-1) as associated with incremental compressive stress according to the combination of first, second, and third order curvature exhibited in these surfaces. Accordingly, differential stresses are calculated based on the geometry of the mechanical unit (144) and incorporated into a mechanical earth model (MEM) previously generated using techniques known to those skilled in the art. For example, the MEM may include an initial stress model for modeling far-field stresses of the wellbore (141). This initial stress model is then revised by incorporating the calculated differential stresses and then used to predict stress-induced failures. In turn, such predicted stress-induced failures are correlated to indicators observed in nature, where available, such as bed parallel slickensides in a core sample and outcrop as well as other indicators described below. An example curvature model is described in reference to FIG. 2.5 below.

For example, termination of natural fractures may be used as a natural indicator. In geology, natural fractures have a start and stop to their vertical extent, where the natural fractures have been observed to terminate at clearly defined mechanical property contrasts. The property contrasts can be reservoir properties such as sand and shale boundaries, bed parallel slip surfaces, or other traditional natural fractures. Outcrop and whole core data have also observed the termination of natural fracture patterns at the interface of slickenside contacts.

In another example, a T-shaped stimulation may be used as another natural indicator. Micro seismic observations of stimulation processes have observed both a vertical height limitation and the alteration from vertical to horizontal propagation.

In yet another example, non-productive stimulation stages may be used as yet another natural indicator. Horizontal wells are routinely stimulated with identical stimulation procedures. Once completed, the wells are measured for contribution to total flow with log data including spinner flow, temperature, fluid density, dielectric probes, etc. In some wells, the production profile may not be uniform, which generally may suggest numerous stages, once thought identical, are incapable of flow.

In one or more embodiments, objective functions are defined to quantify various differences between the predicted stress-induced failures and some of the observed nature indicators described above. Accordingly, correlation between the predicted stress-induced failures and the aforementioned observed indicators may be evaluated based on the statistical difference measured by the objective function.

Generally, a good correlation between the predicted stress-induced failures and the aforementioned indicators confirms that the selection/designation of estimated slickensides is appropriate. When a good correlation is achieved, the revised MEM (or stress model) incorporated with the calculated differential stresses may be used for modeling various aspects of the field operations. An example objective function used to determine good correlation and an example use of the revised MEM for modeling field operations are described in reference to FIGS. 3.1 and 3.2 below.

When the correlation between the predicted stress-induced failures and the aforementioned indicators does not confirm that the selection/designation of estimated slickensides is appropriate, the selection/designation of estimated slickensides is adjusted, and the subsequent process iterated until a satisfactory correlation is achieved.

Returning back to FIG. 1, the stress modeling tool (208) may include a differential stress determining unit (218) configured to determine differential stress based on the aforementioned formation curvature and mechanical units using borehole image logs. More specifically, the differential stress determining unit (218) may be configured to use downhole properties obtained by MWD tools, LWD tools, and/or wireline tools at the wellsite system (204) to identify estimated slickensides from interpreted geological surfaces that are obtained by analyzing wellbore images (e.g., as shown in the screenshot of FIG. 2.3 above). In one or more embodiments, permeability data and/or borehole image artifacts may be correlated to the interpreted geological surfaces for identifying the estimated slickensides. Correspondingly, the differential stress determining unit (218) may be configured to receive user input that identifies estimated slickensides based on user review of the borehole logs and images. The differential stress determining unit (218) may also be configured to automatically identify estimated slickensides based on its own analysis of the borehole logs and images.

According to the aforementioned identified estimated slickensides, the differential stress determining unit (218) is further configured to adjust (e.g., modify or continually update) the MEM based on formation curvature and mechanical units as described in reference to FIG. 2.3 above. Details of the formation curvature are described in FIG. 2.5 below. Details of the mechanical units are described in FIG. 2.4 below. Details of the differential stress calculation workflow are described in reference to FIGS. 3.1 and 3.2 below.

FIG. 2.4 depicts a schematic cross-sectional view of an earth formation having example mechanical units for determining differential stress based on formation curvature and mechanical units using borehole logs in accordance with one or more embodiments. For example, a portion of the schematic cross-sectional view depicted in FIG. 2.4 may correspond to the interpreted wellbore image and various surfaces depicted in FIG. 2.3 above.

Specifically, FIG. 2.4 illustrates a number of layers (e.g., geological layer (233)) having internal deformations (227-1) through (227-4) developed by tangential longitudinal strain, for example due to the aforementioned development of thrusts in a flexural-slip fold. As shown in FIG. 2.4, bed parallel surfaces (e.g., geological surface (231-1), neutral surface (231-3), slickensides (231-2) and (231-4)) may be caused by structural deformation in prior geological time reflected in the aforementioned geologic records. In particular, the parallel bent layers exhibit arc shapes corresponding to the aforementioned second order and/or third order features depicted in FIGS. 2.1 and 2.3 above. Within the geologic record or borehole data, evidence of bed parallel frictional movement (i.e., slip) has been observed in whole core data. Generally, slipped bed parallel surfaces of slickensides may behave like horizontal fractures and cause perturbation in rock properties that can be detected in borehole data.

In one or more embodiments, borehole based data, including image and sonic based measurements (e.g., obtained from a vertical wellbore (225-1) or a deviated wellbore (225-2)), are analyzed to identify anomalies that may suggest a slickenside intercepting the borehole. As noted above, such anomalies may include amplitude attenuation and/or slowness (i.e., increase in velocity) increase reflected in an increase in permeability, variations in Stoneley wave characteristics, decrease of resistivity, enlargement of borehole caliper, etc. For example, the Stoneley wave characteristics are particularly sensitive to permeability anomalies typically associated with slickensides. In one or more embodiments, interpreted geological sub-surfaces are correlated to borehole data anomalies by sliding each other along the wellbore trajectory until sufficient matches can be found between the locations where interpreted geological sub-surfaces intercept the wellbore trajectory and the borehole data anomalies. In one or more embodiments, identifying and correlating borehole data anomalies to a borehole data interpretation may be performed by a user manually. In one or more embodiments, such identification and correlation may be performed automatically using a computer.

For example, borehole data anomalies of the vertical wellbore (225-1) may be identified and correlated to image interpretation results to identify certain bed parallel surfaces as estimated slickensides (231-2) and (231-4). Specifically, the vertical positions where the estimated slickensides (231-2) and (231-4) intercept the vertical wellbore (225-1) may exhibit certain borehole data anomalies (e.g., Stoneley wave attenuation or borehole caliper) while borehole data at the vertical positions where the other sub-surfaces (231-1) and (231-3) intercept the vertical wellbore (225-1) are considered to be within a normal range. These estimated slickensides (231-2) and (231-4) are either (1) confirmed as actual slickensides based on a workflow described in reference to FIGS. 3.1 and 3.2 below or (2) adjusted to iterate the workflow steps until an objective function of the workflow is minimized. For example in scenario (2), one or more of the sub-surfaces (231-1) and (231-3) may be alternatively designated, in a new iteration loop, as the updated slickensides replacing the estimated slickensides (e.g., one or more of slickensides (231-2) and (231-4)) identified in a previous iteration loop.

During the workflow, the slickensides (231-2) and (231-4) may define sections of bent layers referred to as mechanical unit 1 (229-1) through mechanical unit 3 (229-3). In one or more embodiments, differential stresses are calculated based on a curvature model of the mechanical units to predict stress-induced failures occurring at deformations (227-1) through (227-4) that are not otherwise detected. Although the vertical wellbore (225-1) is used in the description above as an example for identifying mechanical units to predict stress-induced failures, those skilled in the art with the benefit of this disclosure will appreciate that the same process may also be applied to the deviated wellbore (225-2). Additional details of the curvature model and predicting stress-induced failures occurring at deformations (227-1) through (227-4) to correlate production patterns of a deviated well bore (225-2) are described in reference to FIGS. 2.5 and 3 below.

FIG. 2.5 depicts a curvature model of a mechanical unit (e.g., mechanical unit 1 (229-1) through mechanical unit 3 (229-3) depicted in FIG. 2.4) for determining differential stress based on formation curvature and mechanical units using borehole logs in accordance with one or more embodiments. In one or more embodiments, the curvature model is used to determine the high resolution local differential stress of the mechanical unit by considering formation curvature dictated and localized strain within the mechanical unit. When the local differential stress is combined with the far-field stress and reservoir moduli properties, the newly defined properties of local structural strain may be used to influence the drilling and completion operations.

Extreme stresses can occur near slip boundaries when formations are bent due to geologic forces. As shown in FIG. 2.5, a layer (250) bounded by the slip surface A (251-1) and slip surface B (251-2) is bent as defined by a radius or curvature R (252) and allowed to slip along the slip surfaces. A neutral surface (251-3) exists in the middle of the bent layer (250), where the distance between the two slip surfaces is 2z. The stress along the neutral surface (251-3) is at an initial value σ. The stress along the upper slip surface A (251-1) is more tensile while the stress along the lower slip surface B (251-2) is more compressive. The stress differential is given by the following equation:

$$\Delta\sigma = \frac{Ez}{(1-v^2)R},$$

where E is Young's modulus, v is Poisson's ratio, z is the distance above or below the neutral surface (250), and R is the radius of curvature (252). In an example with E=4 Mpsi, v=0.20, z=20 ft, and R=1000 ft, the differential stress is calculated to be 41667 psi, which exceeds a typical rock formation strength. In one or more embodiments, the above equation is used to calculate the differential stress as one or more of a tensor, a vector, and a scalar value.

In one or more embodiments, the radius of curvature of the formation (corresponding to the second order curvature and/or third order curvature described in reference to FIGS. 2.1 and 2.3 above), the elastic moduli of the formation, and the location of the slip surfaces are determined from borehole log measurements, such as a resistivity image log. In such embodiments, the formation curvature is generally determined with a higher resolution than the second order curvature resolvable using seismic interpretation techniques.

Returning to FIG. 1, the surface unit (202) may further include the data repository (234), which is configured to store data (e.g., seismic data, borehole image data, interpreted geological surface information, the MEM, initial stress model, estimated slickensides, mechanical unit information, curvature model, and/or differential stress information, among others) for the surface unit (202). The data may organized in a file system, database, or other suitable data structures.

In one or more embodiments, the surface unit (202) includes the controller (214) that is configured to enact commands at the field (105). The controller (214) may be provided with actuation elements coupled to the wellbore (103) and configured to perform drilling operations, such as steering, advancing, etc., or otherwise taking action for other operations, such as fracturing, production, etc. at the wellsite system (204). Commands may be generated based on field data and/or models described above.

While specific components are depicted and/or described for use in the modules of the surface unit (202), it will be appreciated that a variety of components with various functions may be configured to provide the formatting, processing, utility, and coordination functions necessary to process data in the stress modeling tool (208). The components may have combined functionalities and may be implemented as software, hardware, firmware, or suitable combinations thereof.

While a specific subterranean formation (104) with specific geological structures is described above, it will be appreciated that the formation may contain a variety of geological structures. Fluid, rock, water, oil, gas, and other geomaterials may also be present in various portions of the formation. Further, one or more types of measurement may be taken at one or more locations across one or more fields or other locations for comparison and/or analysis using one or more acquisition tools.

FIGS. 3.1 and 3.2 depict one embodiment of a method for determining differential stress based on formation curvature and mechanical units using borehole logs in accordance with one or more embodiments. For example, the method depicted in FIGS. 3.1 and 3.2 may be practiced using the stress modeling tool (208) described in reference to FIG. 1 above. In one or more embodiments, one or more of the elements shown in FIGS. 3.1 and 3.2 may be omitted, repeated, and/or performed in a different order. Accordingly, embodiments of determining differential stress based on formation curvature and mechanical units should not be considered limited to the specific arrangements of elements shown in FIGS. 3.1 and 3.2.

Initially in Step 301, estimated slickensides are identified from interpreted geological surfaces based on a pre-determined criterion. Generally, the interpreted geological surfaces correspond to actual geological surfaces in the subterranean formation, and are identified from borehole image data (e.g., resistivity image) using structural interpretation techniques known to those skilled in the art. As such, one or more portions of the interpreted geological surfaces may exhibit an arc shape with a curvature that can be determined using structural interpretation techniques.

In one or more embodiments, the estimated slickensides are identified by correlating anomalies of borehole data to the interpreted geological surfaces along a wellbore path (or trajectory). One embodiment of identifying estimated slickensides by such correlation is described with reference to FIG. 3.2 below. In one or more embodiments, the estimated slickensides define the bent layers in-between as mechanical units. Example mechanical layers are illustrated in FIGS. 2.3 and 2.4 above.

With respect to FIG. 3.2, interpreted geological surfaces are identified in structurally interpreted wellbore image data of a wellbore (Step 311). In one or more embodiments, the structural interpretation may be performed using various wellbore image log, such as a resistivity image log, an acoustic image log, a neutron image log, etc. Advantageously, the resistivity imaging analysis technique may provide high resolution results that are typically within hundreds of inches of the wellbore. Examples of interpreted geological surfaces based on resistivity imaging analysis technique are depicted as the interpreted geological surfaces (142-1, 142-2, 142-3) in FIG. 2.3 above. Based on the higher resolution capability of structural analysis using the resistivity image, such interpreted geological surfaces may contain better defined third order features that are not resolvable using seismic interpretation techniques, as described with reference to FIG. 2.1 above.

In Step 312, an anomaly is identified in the wellbore image data or other wellbore data. For example, the anomalies in such borehole data may include an increase in permeability, an increase in amplitude attenuation and/or slowness (i.e., increase in velocity) in Stoneley wave characteristics, a decrease in resistivity, brecciated rock fragments observed along a bedding plane using image data, and/or an enlargement of borehole caliper. The anomalies are identified when one or more of the permeability increase, Stoneley attenuation increase, Stoneley slowness (i.e., increase in velocity) increase, resistivity decrease, and/or borehole caliper increase is found to exceed a limit based on a pre-determined criterion. For example, the Stoneley wave characteristics are particularly sensitive to permeability anomalies typically associated with slickensides. In some cases, Stoneley wave interpretation may have a vertical resolution around two feet.

In Step 314, estimated slickensides are identified by correlating the interpreted geological surfaces from a wellbore image log to anomalies exhibited in other borehole data. Specifically, the term "anomaly" is used to refer to a local variation with a value change exceeding a limit based on a pre-determined criterion. While comparing the variation of formation property parameter in the borehole data to a fixed threshold may be used as a criterion for identifying anomalies, the magnitude and distance range of the anomalies may vary considerably depending on borehole size/shape and mud/formation properties. For example, the resistivity curve may decrease from 10 ohm·m to 5 ohm·m at a slickenside in one wellsite, but decrease from 1 ohm·m to 0.5 ohm·m in a different wellsite. In one or more embodiments, forward modeling of the formation is optionally performed in Step 313 (e.g., which may occur between Step 312 and Step 314) where the effect of the increased permeability (or other formation property parameter such as Stoneley wave characteristics, etc.) in the slickenside is not modeled, and this modeled parameter curve is compared with the measured curve in the borehole log. Differences between the measured data and modeled curve can be quantified based on a pre-determined measure (e.g., a summation of absolute value magnitude differences or root-mean-squared magnitude differences over a range) to identify the aforementioned anomalies. In one or more embodiments, forward modeling of the formation is performed using tool response equations known to those skilled in the art.

Returning to FIG. 3.1, in Step 302, a curvature model is defined by the estimated slickensides to represent a mechanical unit. In one or more embodiments, the curvature model represents the mechanical unit as a bent layer based on the combined first, second and third order curvature and/or third order curvature determined by image analysis in Step 301. An example curvature model is described in reference to FIG. 2.5 above.

In Step 303, a differential stress is calculated using the curvature model to generate a stress model. In one or more embodiments, the stress model is generated by revising an initial stress model. Initially, the initial stress model is a portion of a mechanical earth model (MEM), known to those skilled in the art, that is based on both intrinsic properties of the formations (e.g., dynamic and static moduli) and an initial estimate of the extrinsic loading (e.g., pore pressure and stress). As described in reference to FIG. 2.5 above, the mechanical unit represented by the curvature model is bounded by a first estimated slickenside associated with more tensile stress in comparison to an initial stress model and a second estimated slickenside associated with more compressive stress in comparison to the initial stress model. Accordingly, a neutral surface exists in the mechanical unit that is associated with stress as predicted by the initial stress model.

In one or more embodiments, the differential stress between the bounding surfaces of the mechanical unit and the stress predicted by the initial stress model is calculated using equation $\Delta\sigma = Ez/((1-v2)R)$, wherein $\Delta$ is a mathematical difference operator, $\sigma$ represents the stress (including isotropic or anisotropic stress), E and v represent Young's modulus and isotropic or anisotropic Poisson's ratio, respectively, of the subterranean formation within the mechanical unit, z represents a half thickness of the bent layer, and R represents a radius of curvature corresponding to the second order curvature. In one or more embodiments, the above equation is used to calculate the differential stress as one or more of a tensor, a vector, and a scalar value.

In one or more embodiments, elastic moduli are upscaled from the scale of the borehole logs to the scale of the mechanical unit as defined by the estimated slickensides. For example, Young's modulus and Poisson's ratio may be upscaled using the Schoenburg-Muir upscaling technique known to those skilled in the art. Accordingly, the horizontal properties from the upscaling are used in the computation of the differential stresses based on the equation above.

As noted above, in one or more embodiments, the stress model is generated by revising the initial stress model using the calculated differential stresses. For example, the initial stress model includes far-field stresses of the subterranean formation surrounding the wellbore where the borehole image log data are collected for identifying the estimated slickensides. Further, the initial stress model may also include borehole stresses as a result of constructing the wellbore. Generally, stresses in the subterranean formation can be modeled using linear elastic theory. A common stress equation is the linear poro-elastic horizontal strain equations as shown below.

$$\sigma_h - \alpha P_p = \frac{E_h}{E_V} \frac{v_V}{1-v_h}(\sigma_V - \alpha P_p) + \frac{\varepsilon_h E_h}{(1-v_h^2)} + \frac{\varepsilon_H v_h E_h}{(1-v_h^2)}$$

$$\sigma_H - \alpha P_p = \frac{E_h}{E_V} \frac{v_V}{1-v_h}(\sigma_V - \alpha P_p) + \frac{\varepsilon_h v_h E_h}{(1-v_h^2)} + \frac{\varepsilon_H E_h}{(1-v_h^2)}$$

In one or more embodiments, additional stresses calculated using the curvature model are added as an additional stress factor to the linear poro-elastic horizontal strain equations to generate the revised stress equations below as a portion of the stress model.

$$\sigma_h - \alpha P_p = \frac{E_h}{E_V} \frac{v_V}{1-v_h}(\sigma_V - \alpha P_p) + \frac{\varepsilon_h E_h}{(1-v_h^2)} + \frac{\varepsilon_H v_h E_h}{(1-v_h^2)} + \frac{E_h z}{(1-v_h^2)R}$$

$$\sigma_H - \alpha P_p = \frac{E_h}{E_V} \frac{v_V}{1-v_h}(\sigma_V - \alpha P_p) + \frac{\varepsilon_h v_h E_h}{(1-v_h^2)} + \frac{\varepsilon_H E_h}{(1-v_h^2)} + \frac{E_H z}{(1-v_H^2)R}$$

The symbols used in the above equations are defined below.

$\sigma_h$=Minimum horizontal stress
$\sigma_H$=Maximum horizontal stress
$\sigma_v$=Vertical stress $\alpha_h$=Biot's effective stress constant
$\alpha_V$=Biot's effective stress constant
$P_p$=Pore pressure
$E_h$=Horizontal Young's modulus
$E_V$=Vertical Young's modulus
$\epsilon_h$=Strain in the minimum horizontal stress direction
$\epsilon_H$=Strain in the maximum horizontal stress direction
$v_h$=Horizontal Poisson's ratio
$v_V$=Vertical Poisson's ratio
z=vertical distance from the neutral surface in the mechanical unit
R=radius of curvature of the curvature model In Step 304, total stress values in the stress model are compared to a strength property of the subterranean formation. In particular, the far-field total stresses are converted to wellbore effective stresses prior to comparing with the strength property using techniques known in the art. An interval where the total stress value exceeds any strength property of the formation is determined as a modeled stress-induced failure. In one or more embodiments, multiple failure modes are used for identifying the modeled stress-induced failure based on both tensile and shear failures and at extreme wellbore pressures. Examples of such modeled stress-induced failure are depicted in FIG. 2.4 above.

In Step 305, various modeled stress-induced failures are compared with actual stress-induced failure observed from the image analysis to determine a difference. For example, and as depicted in FIG. 2.4, the actual stress-induced failures may occur at deformations (227-1) and (227-2) near the vertical wellbore (225-1) where the actual stress-induced failures are observed based at least on analysis of borehole data of the vertical wellbore (225-1). In particular, the comparison is based on the geometry of modeled and actual stress-induced failure in different failure modes. Example failure modes include breakouts, high angle echelon fractures, and tensile fractures, all of which can be quantified in wellbore images. In particular, breakouts are characterized by borehole depth, azimuthal center, azimuthal width, and depth of damage while high angle echelon fractures and tensile fractures are both characterized by borehole depth, aperture, inclination angle, azimuthal width, and distance from center.

In one or more embodiments, an objective function is constructed to quantify the difference between the model and the observations. For example, different objective functions can be created and used in isolation or in combination. Objective functions are typically based on a comparison of the geometry of actual stress-induced failure in different failure modes and a failure model based on the modeled stress-induced failures generated from the calculated differential stresses. Examples of the failure modes include shear failure wide breakout, shear failure shallow breakout, shear failure high-angle echelon, shear failure narrow breakout, shear failure low-angle breakout, shear failure low-angle echelon, shear failure deep knockout, shear failure cylindrical, tensile failure horizontal, tensile failure vertical, etc. These various failure modes and corresponding information for modeling these example failures are described in Tom Bratton, et al., "Logging-while-drilling Images for Geomechanical, Geological and Petrophysical Interpretations," SPWLA 40th Annual Logging Symposium, 1999.

The objective function M may quantify the difference between the model and the observations in either the L1 norm or the L2 norm. The L1 norm is the absolute value of the difference between the observation and the model.

$$M = \sum_n |P_{observation} - P_{model}|$$

The L2 norm is the square of the difference between the observation and the model.

$$M = \sum_n (P_{observation} - P_{model})^2$$

In these two equations, P is the value of a geometric property of the failure, such as borehole depth, aperture, inclination angle, depth of damage, azimuthal center, azimuthal width, and distance from center. For instance a breakout is observed to have an azimuth $P_{observation}$ of 90 degrees. The failure model also outputs the breakout azimuth as $P_{model}$ based on the stress model.

In one or more embodiments, the objective function $M_{total}$ is created by summing over differences of multiple modeled and observed stress-induced failures as the equation below where P1, P2 and Pn represents multiple geometric properties of multiple failures.

$$M_{total} = M_{P1} M_{P2} + M_{Pn}$$

In Step 306, a determination is made as to whether the difference quantified by the objective function meets a pre-determine criterion. In one or more embodiments, the difference is determined as meeting the pre-determined criterion if the difference is less than a pre-determined minimum threshold. In one or more embodiments, the difference satisfies the pre-determined criterion if the difference is a minimum value determined by iterating through Steps 301 to 306, through which the estimated slickensides are iteratively adjusted to reduce the difference while the stress model is being iteratively updated to more accurately model the stress-induced failures. In the case where multiple failures (i.e., at multiple locations in the formation) are determined each with multiple geometric properties, a global minimum is evaluated based on a linear sum of the individual failures and individual geometric properties.

If the determination in Step 306 indicates that the difference quantified by the objective function is not yet meeting the pre-determine criterion (e.g., not yet at an iterative minimum or still exceeding the pre-determined minimum threshold), inputs to the curvature model, the stress model, and the failure model are varied until the objective function is minimized or rendered less than the minimum threshold. In one or more embodiments, inputs to the curvature model, the stress model, and the failure model are varied by returning the method workflow back to Step 301, where the previous designation of estimated slickensides are adjusted. Specifically, the correlation between borehole data anomalies and the interpreted geological surfaces may be adjusted prior to enter another iteration of the workflow loop of Steps 301 to 306.

If the determination in Step 306 indicates that the difference quantified by the objective function satisfies the pre-determine criterion, the method proceeds to Step 307 where the operations of the field are adjusted based on the stress model. For example, the field operations may correspond to a drilling operation or a completion operation, where the operations may be automatically and/or manually adjusted based on the stress model.

In one or more embodiments, the stress model may be used to predict stress-induced failures (i.e., modeled stress-induced failures) not yet observed in a known analysis or still to be induced in hydraulic fracturing operation. For example, collected data may not include the locations of the predicted stress-induced failures. In another example, such predicted stress-induced failures may be of a small dimension that is less than the resolution limit of any image analysis technique. In yet another example, the stress model may be used for designing hydraulic fracturing operation with better accuracy. The predicted stress-induced failure and/or predicted high stress locations in the stress model are mapped to target fracturing locations along the wellbore. In the example depicted in FIG. 2.4, such target fracturing locations may include the deformations (227-2) and (227-4), where fractures may have already formed or are still to be induced in hydraulic fracturing operation, near the deviated wellbore (225-2). A hydraulic fracturing operation may then be performed at one or more of the determined target fracturing locations. In this example, production characteristics of the deviated wellbore (225-2) may be modeled with better accuracy because the model may take into account results of production before and after a hydraulic fracturing operation.

In one or more embodiments, the stress model may be used for well construction and design. Upon identifying the wellbore position within the mechanical unit described above and the amount of structural curvature, a local differential strain may be calculated. This newly defined strain may then combined with the traditional far field data integrated with the reservoir facies elastic moduli for specific, local, and unique stress map along the well path. The collective stress may then be used for the design of hydraulic stimulation and well construction.

Embodiments of determining differential stress based on formation curvature and mechanical units using borehole logs may be implemented on virtually any type of computer regardless of the platform being used. For instance, as shown in FIG. 4, a computer system (400) includes one or more processor(s) (402) such as an integrated circuit, a central processing unit (CPU) or other hardware processor, associated memory (404) (e.g., random access memory (RAM), cache memory, flash memory, etc.), a storage device (406) (e.g., a hard disk, an optical drive such as a compact disk drive or digital video disk (DVD) drive, a flash memory stick, etc.), and numerous other elements and functionalities typical of today's computers (not shown). The computer (400) may also include input means, such as a keyboard (408), a mouse (410), or a microphone (not shown). Further, the computer (400) may include output means, such as a monitor (412) (e.g., a liquid crystal display LCD, a plasma display, or cathode ray tube (CRT) monitor). The computer system (400) may be connected to a network (414) (e.g., a local area network (LAN), a wide area network (WAN) such as the Internet, or any other similar type of network) via a network interface connection (not shown). Those skilled in the art will appreciate that many different types of computer systems exist (e.g., desktop computer, a laptop computer, a personal media device, a mobile device, such as a cell phone or personal digital assistant, or any other computing system capable of executing computer readable instructions), and the aforementioned input and output means may take other forms, now known or later developed. Generally speaking, the computer system (400) includes at least the minimal processing, input, and/or output means necessary to practice one or more embodiments.

Further, those skilled in the art will appreciate that one or more elements of the aforementioned computer system (400) may be located at a remote location and connected to the other elements over a network. Further, one or more embodiments may be implemented on a distributed system having a plurality of nodes, where each portion of the implementation (e.g., the differential stress determining unit (218), the image analysis unit, etc.) may be located on a different node within the distributed system. In one or more embodiments, the node corresponds to a computer system. Alternatively, the node may correspond to a processor with associated physical memory. The node may alternatively correspond to a processor with shared memory and/or resources. Further, software instructions to perform one or more embodiments may be stored on a computer readable medium such as a compact disc (CD), a diskette, a tape, or any other computer readable storage device.

The systems and methods provided relate to the acquisition of hydrocarbons from an oilfield. It will be appreciated that the same systems and methods may be used for performing subsurface operations, such as mining, water retrieval, and acquisition of other underground fluids or other geomaterials from other fields. Further, portions of the systems and methods may be implemented as software, hardware, firmware or combinations thereof.

While determining differential stress based on formation curvature and mechanical units using borehole logs has been described with respect to a limited number of embodiments, those skilled in the art, having benefit of this disclosure, will appreciate that other embodiments may be devised which do not depart from the scope of determining differential stress based on formation curvature and mechanical units using borehole logs as disclosed herein. Accordingly, the scope of determining differential stress based on formation curvature and mechanical units using borehole logs should be limited only by the attached claims.

What is claimed is:

1. A method for performing wellbore operations of a field having a subterranean formation, the method comprising:
   determining, based on an image log of a wellbore penetrating the subterranean formation, a plurality of interpreted geological surfaces;
   identifying a plurality of estimated slickensides from the plurality of interpreted geological surfaces based on at least one pre-determined criterion;
   calculating, using a processor, a differential stress using a curvature model representing a formation curvature in at least one mechanical unit defined by the plurality of estimated slickensides;
   generating a stress model using the differential stress;
   identifying a modeled wellbore stress-induced failure in response to a total stress value in the stress model exceeding a strength property of the subterranean formation;
   determining a difference between the modeled wellbore stress-induced failure and an observed stress-induced failure in the subterranean formation; and
   updating the stress model by adjusting the plurality of estimated slickensides to, in turn, adjust the difference
   wherein generating the stress model comprises revising an initial stress model of the subterranean formation using the differential stress, wherein the initial stress model represents at least far-field stresses of a wellbore in the subterranean formation,
   wherein the plurality of interpreted geological surfaces comprises a curvature determined from the image log,
   wherein the plurality of interpreted geological surfaces correspond to actual geological surfaces disposed about the wellbore in the subterranean formation, and
   wherein the curvature model represents the at least one mechanical unit as a bent layer based on a curvature of the plurality of interpreted geological surfaces.

2. The method of claim 1, further comprising:
adjusting the wellbore operations based on the stress model.

3. The method of claim 1, further comprising:
locating the observed stress-induced failure in the subterranean formation corresponding to the modeled wellbore stress-induced failure in the stress model.

4. The method of claim 1, further comprising:
including the modeled wellbore stress-induced failure in a plurality of modeled stress induced failures identified at a plurality of locations within the mechanical unit, wherein the plurality of modeled stress-induced failures are identified in response to a plurality of total stress values at the plurality of locations in an updated stress model exceeding the strength property of the subterranean formation;
locating a plurality of observed stress-induced failures in the subterranean formation corresponding to the plurality of modeled stress-induced failures, wherein the difference comprises aggregated differences between the plurality of modeled stress-induced failures and the plurality of observed stress-induced failures in the subterranean formation; and
correlating production characteristics of the wellbore to the plurality of modeled stress induced failures across the plurality of locations.

5. The method of claim 1, further comprising:
analyzing borehole data of the wellbore to identify anomalies of the borehole data; and identifying a portion of the plurality of interpreted geological surfaces as the plurality of estimated slickensides by correlating the anomalies of the borehole data to the portion of the plurality of interpreted geological surfaces.

6. The method of claim 5, wherein the anomalies of the borehole data is identified based on Stoneley wave characteristics.

7. The method of claim 1, wherein the bent layer comprises:
a first estimated slickenside of the plurality of estimated slickensides associated with more tensile stress compared to the initial stress model; and
a second estimated slickenside of the plurality of estimated slickensides associated with more compressive stress compared to the initial stress model,
wherein the differential stress is calculated using equation $\Delta\sigma = Ez/((1-v^2)R)$, wherein $\Delta$ is a mathematical difference operator, $\sigma$ represents at least one selected from a group consisting of isotropic stress and anisotropic stress, E represents Young's modulus, v represents at least one selected from a group consisting of isotropic Poisson's ratio and anisotropic Poisson's ratio of the subterranean formation within the mechanical unit, z represents a half thickness of the bent layer, and R represents a radius of curvature corresponding to the second order curvature.

8. A surface unit for performing wellbore operations of a field having a subterranean formation, the surface unit comprising:
a processor and memory;
an image analysis unit stored in the memory, executing on the processor of the computer, and configured to determine, based on an image log of a wellbore penetrating the subterranean formation, a plurality of interpreted geological surfaces;
a differential stress determining unit stored in the memory, executing on the processor, and configured to:
identify a plurality of estimated slickensides from the plurality of interpreted geological surfaces based on a pre-determined criterion,
calculate a differential stress using a curvature model representing at least one mechanical unit defined by the plurality of estimated slickensides, the curvature model representing the at least one mechanical unit as a bent layer based on a curvature of the plurality of interpreted geological surfaces,
generate a stress model using the differential stress,
identify a modeled wellbore stress-induced failure in response to a total stress value in the stress model exceeding a strength property of the subterranean formation,
determine a difference measure to represent at least a difference between the modeled wellbore stress-induced failure and an observed stress-induced failure in the subterranean formation, and
update the stress model by adjusting the plurality of estimated slickensides to reduce the difference; and
a repository for storing the curvature model, the initial stress model, and the stress model,
wherein the plurality of interpreted geological surfaces comprises a curvature determined from the image log,
wherein the plurality of interpreted geological surfaces correspond to actual geological surfaces disposed about the wellbore in the subterranean formation, and
wherein the curvature model represents the at least one mechanical unit as the bent layer based on the curvature.

9. The surface unit of claim 8, wherein generating the stress model comprises revising an initial stress model of the subterranean formation using the differential stress, wherein the initial stress model represents at least far-field stresses of a wellbore in the subterranean formation.

10. The surface unit of claim 8, further comprising:
a controller comprising an actuation element coupled to the wellbore for performing the wellbore operations, the controller configured to adjust the wellbore operations based on the stress model.

11. The surface unit of claim 8, wherein the differential stress determining unit is further configured to:
analyze borehole data of the wellbore to identify anomalies of the borehole data; and
identify a portion of the plurality of interpreted geological surfaces as the plurality of estimated slickensides by correlating the anomalies of the borehole data to the portion of the plurality of interpreted geological surfaces.

12. The surface unit of claim 11, wherein the anomalies of the borehole data is identified based on Stoneley wave characteristics.

13. The surface unit of claim 8, wherein the differential stress determining unit is further configured to:
locate the observed stress-induced failure in the subterranean formation corresponding to the modeled wellbore stress-induced failure in the stress model.

14. The surface unit of claim 13, wherein the differential stress determining unit is further configured to:
include the modeled wellbore stress-induced failure in a plurality of modeled stress induced failures identified at a plurality of locations within the mechanical unit, wherein the plurality of modeled stress-induced failures are identified in response to a plurality of total stress values at the plurality of locations in an updated stress model exceeding the strength property of the subterranean formation;

locate a plurality of observed stress-induced failures in the subterranean formation corresponding to the plurality of modeled stress-induced failure, wherein the difference measure represents aggregated differences between the plurality of modeled stress-induced failures and the plurality of observed stress-induced failures in the subterranean formation; and correlate production characteristics of the wellbore to the plurality of modeled stress induced failures across the plurality of locations.

15. A surface unit for performing wellbore operations of a field having a subterranean formation, the surface unit comprising:

a processor and memory;

an image analysis unit stored in the memory, executing on the processor of the computer, and configured to determine, based on an image log of a wellbore penetrating the subterranean formation, a plurality of interpreted geological surfaces;

a differential stress determining unit stored in the memory, executing on the processor, and configured to:
identify a plurality of estimated slickensides from the plurality of interpreted geological surfaces based on a pre-determined criterion,
calculate a differential stress using a curvature model representing at least one mechanical unit defined by the plurality of estimated slickensides, the curvature model representing the at least one mechanical unit as a bent layer based on a curvature of the plurality of interpreted geological surfaces,
generate a stress model using the differential stress,
identify a modeled wellbore stress-induced failure in response to a total stress value in the stress model exceeding a strength property of the subterranean formation,
determine a difference measure to represent at least a difference between the modeled wellbore stress-induced failure and an observed stress-induced failure in the subterranean formation, and
update the stress model by adjusting the plurality of estimated slickensides to reduce the difference; and a repository for storing the curvature model, the initial stress model, and the stress model;

wherein generating the stress model comprises revising an initial stress model of the subterranean formation using the differential stress, wherein the initial stress model represents at least far-field stresses of a wellbore in the subterranean formation, and wherein the bent layer comprises:
a first estimated slickenside, of the plurality of estimated slickensides, associated with more tensile stress compared to the initial stress model; and
a second estimated slickenside, of the plurality of estimated slickensides, associated with more compressive stress compared to the initial stress model,
wherein the differential stress is calculated using equation $\Delta\sigma = Ez/((1-v^2)R)$, wherein $\Delta$ is a mathematical difference operator, $\sigma$ represents at least one selected from a group consisting of isotropic stress and anisotropic stress, E represents Young's modulus, v represents at least one selected from a group consisting of isotropic Poisson's ratio and anisotropic Poisson's ratio of the subterranean formation within the mechanical unit, z represents a half thickness of the bent layer, and R represents a radius of curvature corresponding to the second order curvature.

16. A non-transitory computer readable medium storing instructions, the instructions when executed causing a processor to:

determine, based on an image log of a wellbore penetrating the subterranean formation, a plurality of interpreted geological surfaces;

identify a plurality of estimated slickensides from the plurality of interpreted geological surfaces based on a pre-determined criterion;

calculate a differential stress using a curvature model representing at least one mechanical unit defined by the plurality of estimated slickensides, the curvature model representing the at least one mechanical unit as a bent layer based on a curvature of the plurality of interpreted geological surfaces;

generate a stress model using the differential stress;

identify a modeled wellbore stress-induced failure in response to a total stress value in the stress model exceeding a strength property of the subterranean formation;

determine a difference between the modeled wellbore stress-induced failure and an observed stress-induced failure in the subterranean formation; and update the stress model by adjusting the plurality of estimated slickensides to reduce the difference;

include the modeled wellbore stress-induced failure in a plurality of modeled stress induced failures identified at a plurality of locations within the mechanical unit, wherein the plurality of modeled stress-induced failures are identified in response to a plurality of total stress values at the plurality of locations in an updated stress model exceeding the strength property of the subterranean formation;

locate a plurality of observed stress-induced failures in the subterranean formation corresponding to the plurality of modeled stress-induced failures, wherein the difference comprises aggregated differences between the plurality of modeled stress-induced failures and the plurality of observed stress-induced failures in the subterranean formation; and correlate production characteristics of the wellbore to the plurality of modeled stress induced failures across the plurality of locations.

17. The non-transitory computer readable medium of claim 16, wherein generating the stress model comprises revising an initial stress model of the subterranean formation using the differential stress, wherein the initial stress model represents at least far-field stresses of a wellbore in the subterranean formation.

* * * * *